United States Patent [19]

Watson et al.

[11] Patent Number: 5,249,080

[45] Date of Patent: Sep. 28, 1993

[54] SQUARE TELESCOPE AND APODIZED CORONAGRAPH FOR IMAGING NONSOLAR PLANETS AND THE LIKE

[75] Inventors: Steven M. Watson, Layton, Utah; James P. Mills, Brighton, Mich.

[73] Assignee: The United States of America as represented by the Secretary of the Air Force, Washington, D.C.

[21] Appl. No.: 907,270

[22] Filed: Jul. 1, 1992

[51] Int. Cl.$^5$ ............................................. G02B 27/00
[52] U.S. Cl. .................................. 359/601; 359/399; 359/894; 359/428
[58] Field of Search ............... 359/894, 601, 602, 365, 359/364, 362, 399, 423, 589, 853, 849, 850, 426, 427, 428, 429, 430; 250/201.1, 352

[56] References Cited

U.S. PATENT DOCUMENTS

| | | | |
|---|---|---|---|
| 4,027,943 | 6/1977 | Everett | 359/399 |
| 4,645,314 | 2/1987 | Schroder | 359/365 |
| 4,790,641 | 12/1988 | Halldorsson | 359/399 |
| 4,822,156 | 4/1989 | Hugenell | 359/853 |
| 4,825,062 | 4/1989 | Rather et al. | 250/201.1 |
| 4,923,293 | 5/1990 | Nelles et al. | 359/364 |
| 4,972,085 | 11/1990 | Weber et al. | 250/352 |
| 5,107,370 | 4/1992 | Dey | 359/428 |

Primary Examiner—Loha Ben
Attorney, Agent, or Firm—Fredric L. Sinder; Thomas L. Kundert

[57] ABSTRACT

A new coronagraph sufficiently increases the contrast ratio between the infrared image of a nonsolar star and a possible orbiting nonsolar planet to make imaging of such a planet possible. The coronagraph is used with an infrared telescope system having a square objective or aperture. Unwanted stellar irradiance is diffracted orthogonally by the square telescope aperture or objective so that a coronagraph apodizer in the first focal plane in the shape of crossed arms, and a coronagraph Lyot stop in the pupil plane with a square opening, stop most of the on-axis direct and diffracted stellar energy while allowing most of the planet irradiance to pass through the coronagraph. The discarded light reflected from the back of the apodizer can be used to provide information concerning piston and tilt errors of individual segments of a segmented telescope so that an array of correcting piston-tilt mirrors can be controlled to align the telescope.

7 Claims, 12 Drawing Sheets

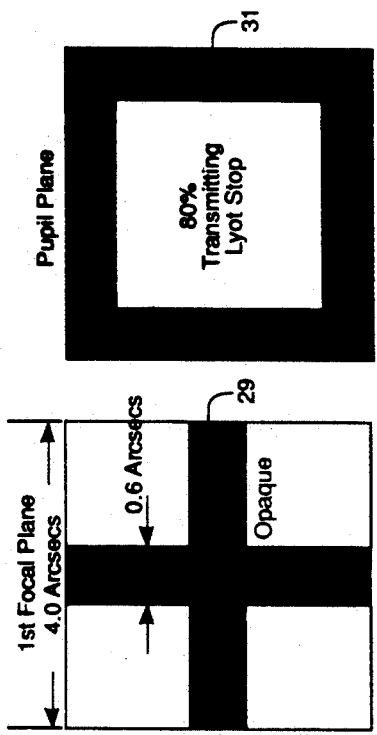
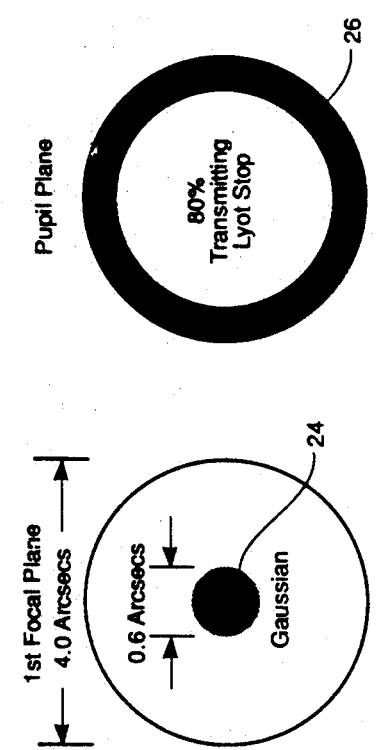
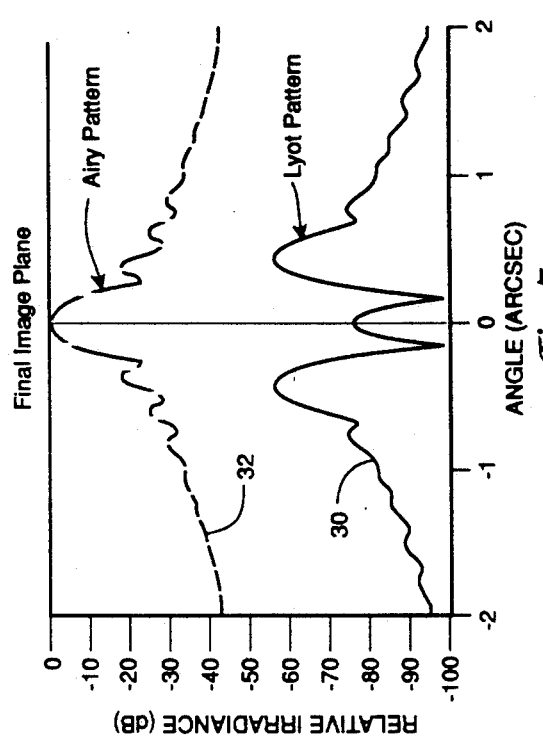
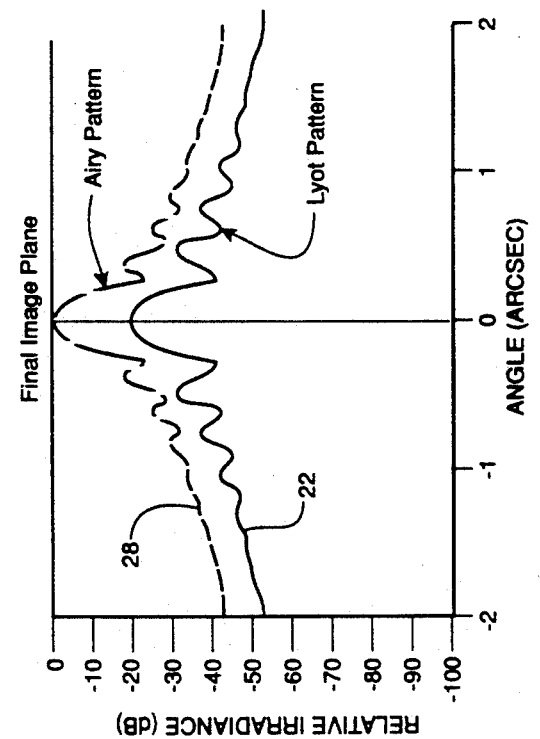
Fig. 2 Prior Art
Fig. 3 Prior Art
Fig. 4 Prior Art
Fig. 5
Fig. 6
Fig. 7

5,249,080

SQUARE TELESCOPE AND APODIZED CORONAGRAPH FOR IMAGING NONSOLAR PLANETS AND THE LIKE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to telescopic imaging, and more particularly to a new coronagraph for increasing the contrast ratio between the infrared image of a star and that of a possible orbiting planet.

The search by direct telescopic imaging for planets orbiting stars not our sun is extremely difficult because of the angular proximity of such planets to the star around which they orbit and because of the faintness of such planets relative to their stars. The image of a nonsolar planet would typically be separated by only tenths of arcseconds from that of its star and there would be $10^9$ more starlight than planet light at visible wavelengths.

The search for so-called nonsolar or extra-solar planets can be made somewhat easier by working at infrared wavelengths, where the contrast ratio between star and planet would be only $10^7$.

The contrast ratio can be further increased by selectively suppressing the image of the star using a coronagraph. A coronagraph is most often used to suppress the central disk image of the sun so that its surrounding corona can be seen or imaged. A properly shaped coronagraph "apodizes" the energy in the star's diffraction pattern. Apodization is the process of applying a preselected function to a waveform to gradually reduce its amplitude as it approaches a certain point. Apodization can be performed mathematically, optically, or mechanically. A coronagraph generally optically and/or mechanically apodizes the sun's image in a manner which can be described mathematically.

The best known example of a coronagraph is the standard Lyot coronagraph, first described by M. B. Lyot. The Lyot coronagraph, shown in FIG. 1 of the drawings and described in more detail in the Detailed Description of the invention, combines a centrally positioned first apodizer, for blocking the direct light from a star, with an annular mask, called a Lyot stop, for blocking the star's diffracted light.

Unfortunately, even prior art improved versions of the Lyot coronagraph (using a Gaussian first apodizer) cannot increase contrast ratios sufficiently to discern, or image, a planet having a relative irradiance of $10^{-7}$.

Thus it is seen that there is a need for a new coronagraph with improved performance sufficient to make possible detection of nonsolar planets.

It is, therefore, a principal object of the present invention to provide new shapes for coronagraph apertures, apodizers and Lyot stops that can suppress stellar irradiance sufficiently to directly image a planet in proximity to its parent star.

It is a feature of the present invention that it can use the relatively bright on-axis point source which is otherwise deliberately discarded by the coronagraph as a reference signal to maintain alignment of a multi-segment telescope mirror.

It is an advantage of the present invention that its new shapes for coronagraph apertures, apodizers and Lyot stops also allow greater amounts of planet irradiance to propagate through the imaging system.

It is another advantage of the present invention that it is simple to understand and will be simple and straightforward to make and to use.

These and other objects, features and advantages of the present invention will become apparent as the description of certain representative embodiments proceeds.

SUMMARY OF THE INVENTION

The present invention provides new shapes for coronagraph apertures, apodizers and Lyot stops that sufficiently improve the performance of an apodized coronagraph to make possible detection of nonsolar planets. The unique discovery of the present invention is that a combination of a square input aperture, a cross-shaped apodizer in the first focal plane of a coronagraph and a square Lyot stop in the pupil plane sufficiently reduces the effects of stellar diffracted energy on a planet image in the final image place to permit discovery of such a planet. Adding circular corner stops to the Lyot stop further improves the reduction of the effects of stellar diffracted energy. Another unique discovery of the present invention is that the relatively bright on-axis point source from the star itself, which is otherwise deliberately discarded by a prior art coronagraph, can be used as a reference signal to maintain alignment of a multi-segment telescope mirror.

Accordingly, the present invention is directed to a coronagraph for a telescope having a square objective, comprising an apodizer comprising crossed arms and a Lyot stop having a square opening. The apodizer may be in a first focal plane and the Lyot stop may be in a pupil plane. The apodizer arms may be opaque along their centerlines and become progressively more transmissive toward their edges according to a preselected profile. The preselected profile may be a Gaussian curve. The coronagraph may further comprise a circular quadrant stop at each corner of the Lyot stop square opening.

The present invention is also directed to a method for a telescope having a square objective using a coronagraph for suppressing light energy from an on-axis light source, comprising the steps of blocking on-axis light rays from the light source with an apodizer comprising crossed arms and blocking diffracted light rays from the on-axis light source with a Lyot stop having a square opening. The method may further comprise the step of blocking diffracted light rays from the on-axis light source with a circular quadrant stop located at each corner of the Lyot stop square opening.

The present invention is also directed to an alignment system for correcting alignment errors for a segmented telescope, wherein the segmented telescope includes a coronagraph, and wherein the coronagraph includes an apodizer, comprising an array of telescope primary segments, an array of piston-tilt mirrors, wherein each piston-tilt mirror corresponds to a telescope primary segment, and wherein each piston-tilt mirror is in a conjugate image plane of its corresponding telescope primary segment, an array of lenses, wherein each lens corresponds to a piston-tilt mirror and to that piston-tilt mirror's corresponding telescope primary segment, and wherein each lens of the array of lenses, for light rays reflected from the back of the apodizer, is in a conjugate image plane of both its corresponding telescope primary segment and of its corresponding piston-tilt mirror, position sensor means for determining the relative positions of each focal point of the light rays focused by each lens of the array of lenses, and computer means for reading the relative focal point positions, for determining needed piston and tilt corrections to each of the piston-tilt mirrors so that, in combination, they project a light wavefront known to be the same as those of light rays impinging on the array of primary segments, and for applying those piston and tilt corrections to the array of piston-tilt mirrors to effect that correction.

The present invention is further directed to an alignment system for correcting alignment errors for a segmented telescope having primary segments, wherein the segmented telescope includes a coronagraph, and wherein the coronagraph includes an apodizer, comprising means for analyzing light rays reflecting from the back of the apodizer, means for determining from those light rays primary segment misalignments, and means responsive to the determining means for realigning primary segments.

The present invention is yet further directed to a method for correcting mirror alignment errors for the primary segments of a segmented telescope, wherein the segmented telescope includes a coronagraph, and wherein the coronagraph includes an apodizer, comprising the steps of providing an array of piston-tilt mirrors, wherein each piston-tilt mirror corresponds to a telescope primary segment, and wherein each piston-tilt mirror is in a conjugate image plane of its corresponding telescope primary segment, providing an array of lenses, wherein each lens corresponds to a piston-tilt mirror and to that piston-tilt mirror's corresponding telescope primary segment, and wherein each lens of the array of lenses, for light rays reflected from the back of the apodizer, is in a conjugate image plane of both its corresponding telescope primary segment and of its corresponding piston-tilt mirror, determining the relative positions of each focal point of the light rays focused by each lens of the array of lenses, and from the relative focal point positions, determining needed piston and tilt corrections to each of the piston-tilt mirrors so that, in combination, they project a light wavefront known to be the same as those of light rays impinging on the primary segments, and applying those piston and tilt corrections to the array of piston-tilt mirrors to effect that correction.

The invention is still further directed to a method for correcting mirror alignment errors for the primary segments of a segmented telescope, wherein the segmented telescope includes a coronagraph, and wherein the coronagraph includes an apodizer, comprising the steps of analyzing light rays reflecting from the back of the apodizer to determine primary segment misalignments and realigning the primary segments from that determination.

DESCRIPTION OF THE DRAWINGS

The present invention will be more clearly understood from a reading of the following detailed description in conjunction with the accompanying drawings wherein:

FIG. 2 is a schematic view of a prior art centered Gaussian apodizer for a standard coronagraph;

FIG. 3 is a schematic view of a prior art circular Lyot stop for a standard coronagraph;

FIG. 4 is a graph of the diffraction pattern for a standard coronagraph with the FIG. 2 apodizer and FIG. 3 Lyot stop both present and removed;

FIG. 5 is a schematic view of a new cross-shaped apodizer constructed according to the teachings of the present invention;

FIG. 6 is a schematic view of a square Lyot stop constructed as part of a new coronagraph according to the teachings of the present invention;

FIG. 7 is a graph of the diffraction pattern for a coronagraph with the FIG. 5 apodizer and FIG. 6 Lyot stop both present and removed;

DETAILED DESCRIPTION

Figure 1:
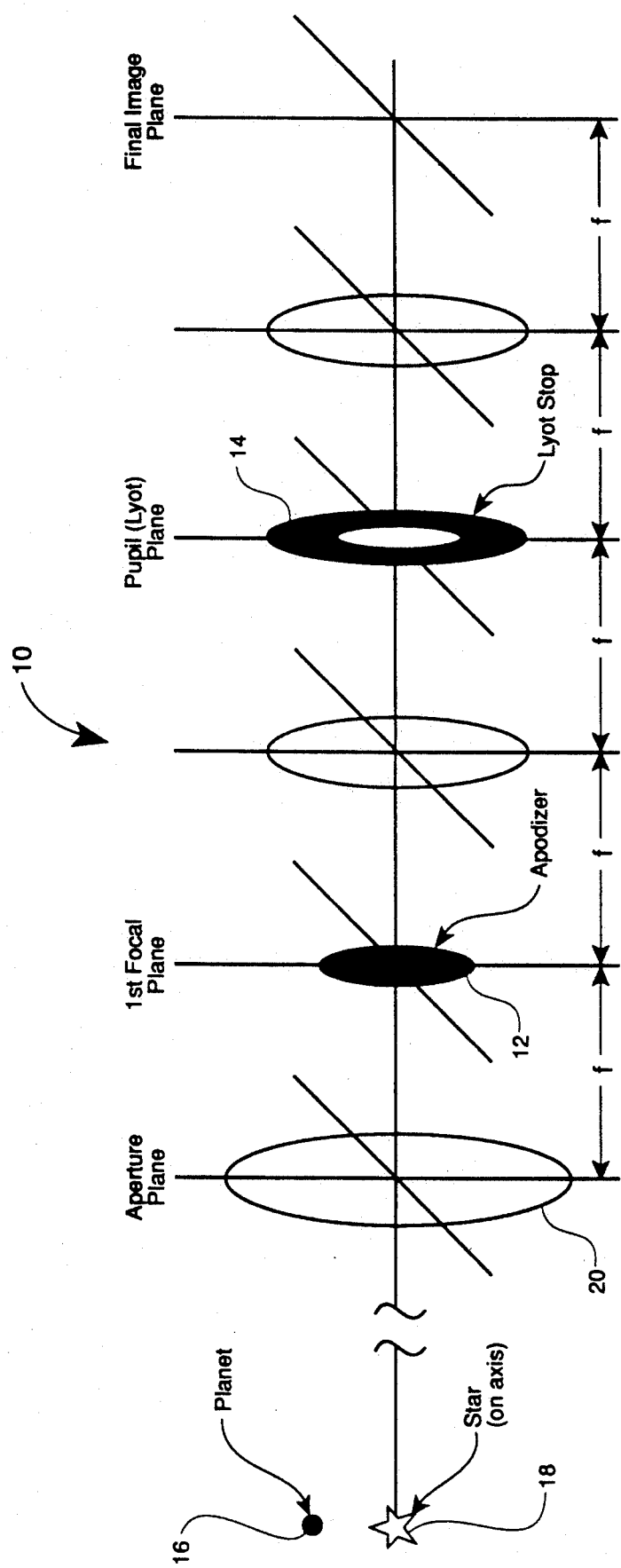
FIG. 1 is a schematic view of a standard prior art coronagraph showing a prior art apodizer and a prior art Lyot stop.

Referring now to FIG. 1 of the drawings, there is shown as part of an infrared (IR) telescope system a schematic view of a standard prior art Lyot coronagraph 10 showing a prior art circular apodizer 12 and a prior art Lyot stop 14. Apodizer 12 and Lyot stop 14 are shown with close cross-hatching which is intended to indicate that they are opaque. Such close cross-hatching is intended to indicate opaqueness in all the figures except FIG. 21. Coronagraph system 10 is to be used to image a planet 16 orbiting a star 18. Star 18 is assumed to be on the optical axis of coronagraph 10 and plane wave illumination on coronagraph 10 from star 18 is also assumed. A collecting objective 20 is located on the optical axis at the aperture plane of coronagraph 10. Apodizer 12 is centered around the optical axis at the first focal plane and Lyot stop 14 is centered around the optical axis at the pupil, or Lyot, plane.

Apodizer 12, also called an occulting mask, concentrates diffracted starlight from star 18 at the outer edge of the pupil plane image of the telescope. The pupil image is formed using optics (not shown) located following the first focal plane. The diffracted starlight is then blocked by Lyot stop 14 and the remaining transmitted energy is focused at the final image plane.

As discussed in the Background of the Invention, to improve the contrast ratio of planet light to starlight, telescopic imaging of a nonsolar planet should be done at infrared wavelengths. Such an infrared telescope will require an aperture of about 10-20 meters.

There has been much analysis of the original Lyot coronagraph. A 1988 study by Ftaclas et al., "A High Efficiency Coronagraph for Astronomical Application," Topical Meeting on Space Optics for Astrophysics and Earth and Planetary Remote Sensing, 1988

Technical Digest Series, Vol. 10, p. 62 (Optical Society of America, Washington, D.C.), investigated the use of an occulting mask which is opaque in the center and becomes gradually more transmissive with increasing radial distance. They studied a Gaussian-apodized mask and demonstrated its advantage over that of a prior art hard (fully occulting) stop. Gaussian refers to the use of a Gaussian (or normal) distribution applied to the transmittance of an apodizer or mask so that the apodizer or mask becomes more transmissive to light towards its edges according to a Gaussian curve. The use of a Gaussian, or other mathematically well understood, apodizer over a hard stop or a simple opaque disk avoids abrupt changes in the diffracted light energy profile from edge effects. These abrupt changes are difficult to analyze or to control. Gaussian-apodized masks may be made by a variety of techniques. One example technique is to use a spinning opaque disk as the mask so that the resulting distribution of light transmitted through the cross-sectional area filled by the spinning disk is Gaussian or either side of the axis about which the disk spins.

FIG. 4 depicts a cross-section of a stellar diffraction pattern 22, called a Lyot pattern, in the final image plane of a coronagraph with a 16.0 meter circular objective, a centered Gaussian apodizer 24 (shown in FIG. 2) with a transmittance value of 0.98 at 0.6 arcsecond in diameter in the first focal plane, and an 80% transmitting circular Lyot stop 26, shown in FIG. 3, in the pupil plane (80% refers to the area of the pupil plane which is not occulted by the stop). For comparison, a so-called Airy pattern 28 for the same system without an apodizer for Lyot stop is also shown.

It can be seen from FIG. 4 that a standard Lyot coronagraph would not be capable of imaging a planet having a relative irradiance of $10^{-7}$ ($-70$ dB). A systematic search for objective or aperture shapes which would permit detection of such a weak signal leads to the conclusion that a square, instead of a round, aperture or objective is best. This is because straight edges on an aperture diffract energy in an orthogonal direction in the first focal plane and a square aperture diffracts that energy in the minimum number of directions. This will leave angular regions of the first focal plane where the diffracted energy from a star would not overwhelm the diffracted energy from a planet.

An example of the improvements provided by the teachings of the present invention are shown in FIG. 7. FIG. 7 depicts a cross-section of an irradiance distribution 30 in the final image plane of a 14.2 meter square objective, with, shown in FIG. 5, an opaque cross-shaped block apodizer 29 according to the teachings of the present invention in the first focal plane and, shown in FIG. 6, an 80% transmitting square Lyot stop 31 in the pupil plane. The irradiance distribution 30 shown for the final image plane is along a diagonal relative to the square aperture edges. FIG. 7 also includes an Airy pattern 32 for comparison. FIG. 7 shows that the stellar diffraction pattern provided by the present invention's discovery of a cross-shaped apodizer and a square Lyot stop is weak enough to allow detection of a planet.

Figure 10:
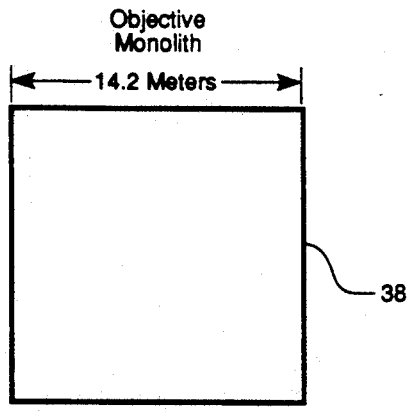
FIG. 10 is a schematic view of the square objective monolith used to make both the FIG. 8 pupil plane intensity plot and the FIG. 11 pupil plane intensity plot.
Figure 13:
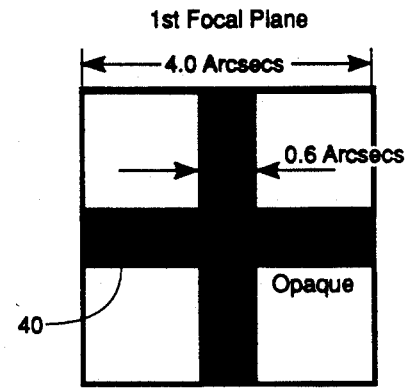
FIG. 13 is a schematic view of the cross-shaped apodizer used to make both the FIG. 8 pupil plane intensity plot and the FIG. 11 pupil plane intensity plot.
Figure 9:
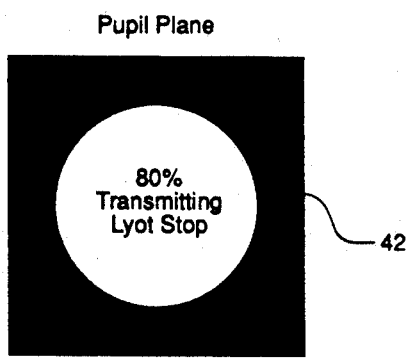
FIG. 9 is a schematic view of the prior art circular Lyot stop used to make the FIG. 8 pupil plane intensity plot.
Figure 12:
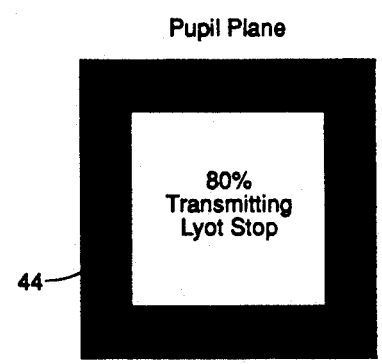
FIG. 12 is a schematic view of the square Lyot stop used to make the FIG. 11 pupil plane intensity plot.
Figure 8:
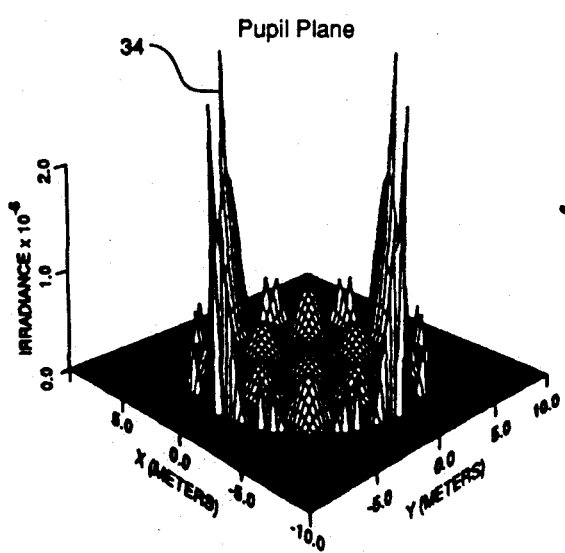
FIG. 8 is a pupil plane intensity plot for a coronagraph with a prior art circular Lyot stop and a new cross-shaped apodizer according to the present invention.
Figure 11:
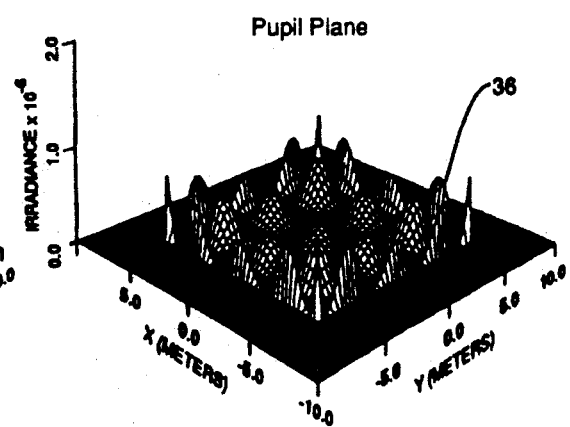
FIG. 11 is a pupil plane intensity plot for a coronagraph with a square Lyot stop and a new cross-shaped apodizer according to the teachings of the present invention.

The utility of a square Lyot stop is illustrated in FIGS. 8 and 11. FIGS. 8 and 11 are pupil plane intensity plots 34 and 36 of the stellar irradiance passing through a coronagraph with a 14.2 meter wide monolithic square objective 38, shown in FIG. 10, and 0.6 arcsecond wide opaque arms 40 located in the first focal plane, shown in FIG. 12, and through, in the pupil plane, for FIG. 8, a prior art 80% transmitting circular Lyot stop 42, shown in FIG. 9, and, for FIG. 11, a new 80% transmitting square Lyot stop 44 shown in FIG. 13. The square objective 38 and arms 40 shown in FIGS. 10 and 13 apply to both FIGS. 8 and 11 and are divided between the two figures to facilitate their layout on the page. Particularly noteworthy is the relative irradiance remaining at the periphery of the pupil plane of the square Lyot system compared to that of the circular Lyot system.

Figure 16:
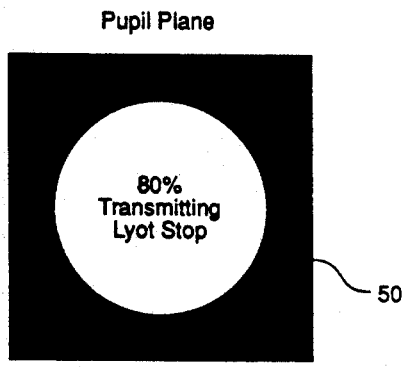
FIG. 16 is a schematic view of the prior art circular Lyot stop used to make the FIGS. 14 and 15 final plane intensity plots.
Figure 19:
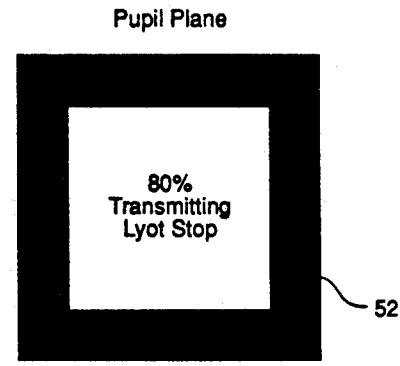
FIG. 19 is a schematic view of the new square Lyot stop used to make the FIGS. 17 and 18 final plane intensity plots.
Figure 15:
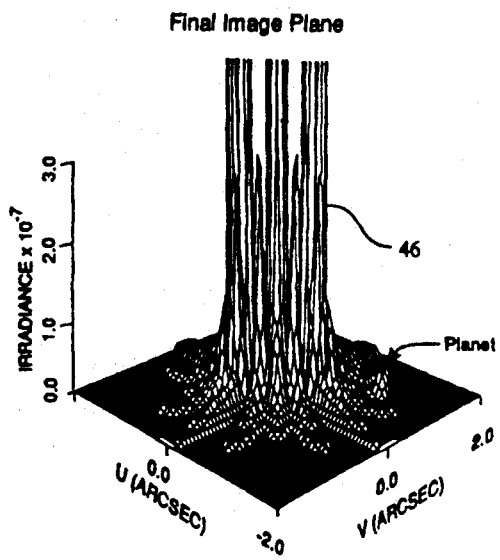
FIG. 15 is a final plane intensity plot in three dimensions for a coronagraph with a prior art circular Lyot stop.
Figure 18:
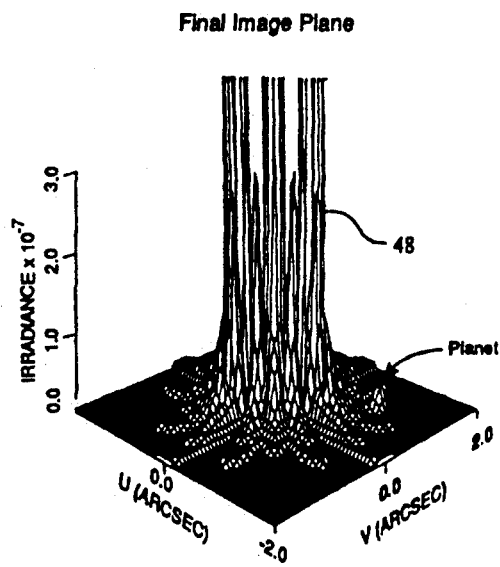
FIG. 18 is a final plane intensity plot in three dimensions for a coronagraph with a new square Lyot stop according to the teachings of the present invention.
Figure 14:
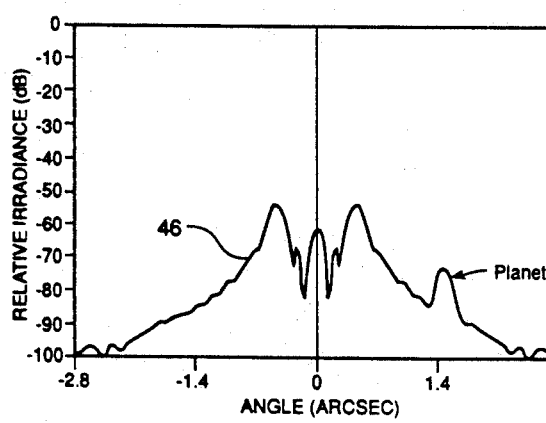
FIG. 14 is a final plane intensity plot in two dimensions for a coronagraph with a prior art circular Lyot stop.
Figure 17:
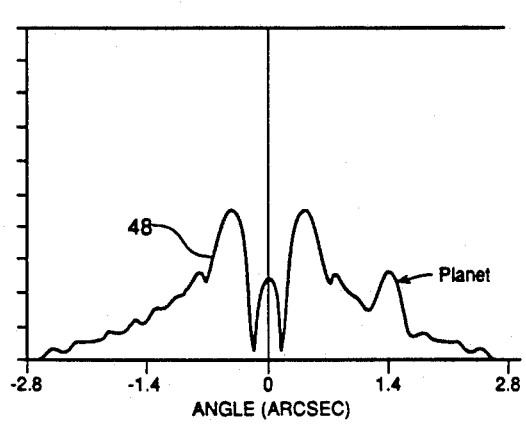
FIG. 17 is a final plane intensity plot in two dimensions for a coronagraph with a new square Lyot stop according to the teachings of the present invention.

FIGS. 14-15 and 17-18 depict the irradiance 46 and 48, in both two (FIGS. 14 and 17) and three (FIGS. 15 and 18) dimensions, in the final image plane of coronagraphs with circular 50 and square 52 Lyot stops, shown respectively in FIGS. 16 and 19. In this and in all later figures, the irradiance cross-sections are along the diagonal axis through the central portion of the final image plane. Irradiance from a planet at coordinates (1.0, 1.0) was added incoherently to the on-axis stellar irradiance. The planet has an irradiance factor $10^{-7}$ less than the parent star's peak irradiance. As shown in FIGS. 17 and 18, the square Lyot stop 52 tends to diffract the stellar irradiance along the U and V axes in the final image plane. The areas of the final image plane outside the diffracted energy along the U and V axes are considered the viewing quadrants. Because the circular Lyot stop 50 is circularly symmetric, it diffracts more stellar irradiance into the viewing quadrants than does square Lyot stop 52. Square Lyot stop 52 causes a greater ratio between the planet and filtered stellar irradiance in the viewing quadrants, thus facilitating detection of the planet. The peak planet irradiance loss due to the opaque arms in the first focal plane and due to circular Lyot stop 50 and square Lyot stop 52 in the pupil plane was $-3.5$ dB for both cases. Compared to the circular objective and circular Lyot stop 50, the square objective with its associated square Lyot stop 52 performed in a superior manner as can be seen by comparing FIGS. 14 and 17 with FIGS. 4 and 7. This is because the square objective concentrates the diffracted starlight energy along the orthogonal arms where it can be efficiently stopped. The obvious disadvantage of using opaque occulting arms in the first focal plane is the inability to image the planet if the planet is obscured by one of the arms.

Figure 22:
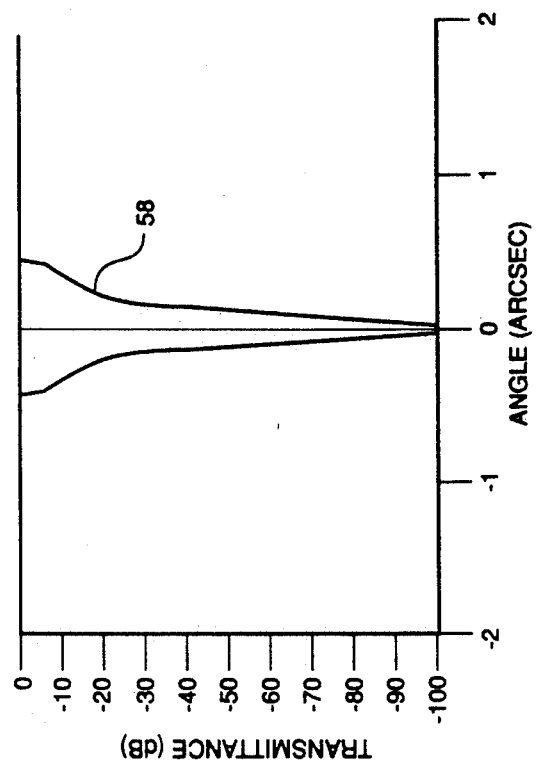
FIG. 22 is a first focal plane transmittance plot along a diagonal axis across the center of the Gaussian cross-shaped apodizer of FIG. 21.
Figure 21:
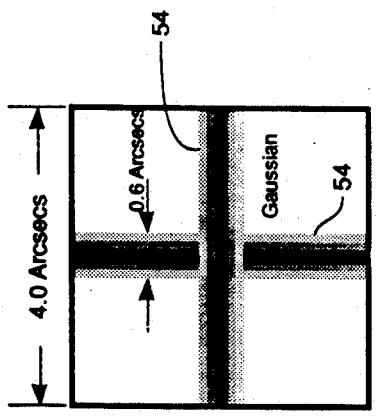
FIG. 21 is a schematic view of the Gaussian cross-shaped apodizer used to make the FIG. 20 first focal plane transmittance plot.
Figure 20:
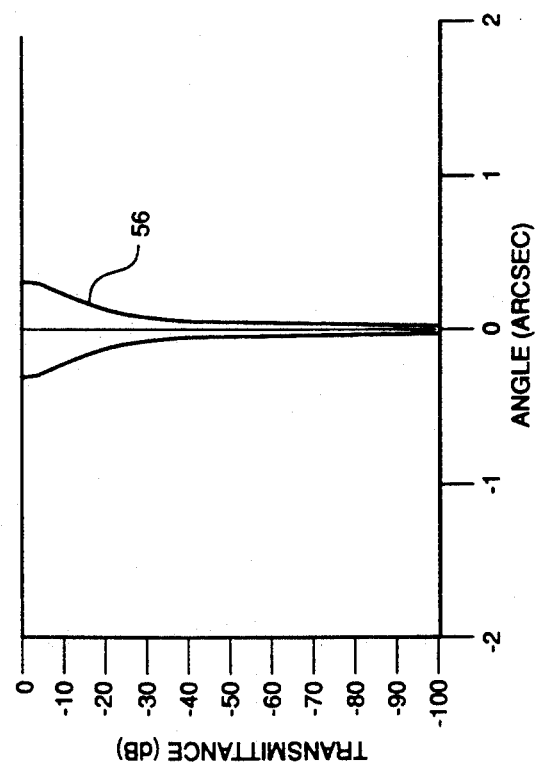
FIG. 20 is a first focal plane transmittance plot along a diagonal axis across one of the Gaussian arms of a new cross-shaped apodizer.

FIGS. 20 and 22 show the effects of replacing the opaque arms in the first focal plane with, shown in FIG. 21, a partially-transmitting Gaussian profile across each arm 54. Each arm 54 is 0.6 arcsecond wide. FIG. 20 shows the transmittance 56 of one of the arms parallel to the y-axis, at least 0.3 arcsecond from the origin. FIG. 22 shows the transmittance 58 along a diagonal through the center of the field of view (FOV).

Figure 23:
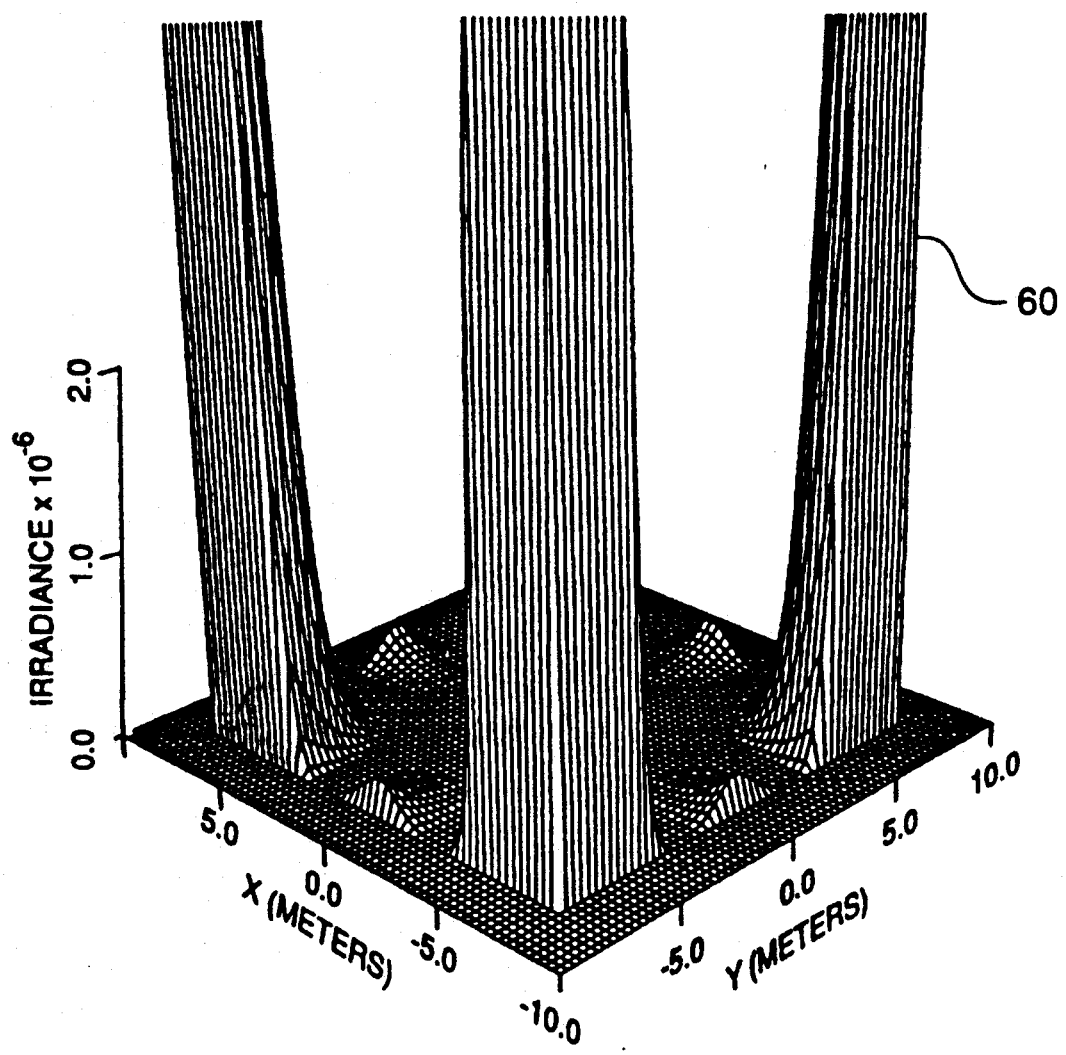
FIG. 23 is a pupil plane intensity plot for a coronagraph with a monolithic square objective and Gaussian arms in the first focal plane according to the teachings of the present invention.
Figure 25:
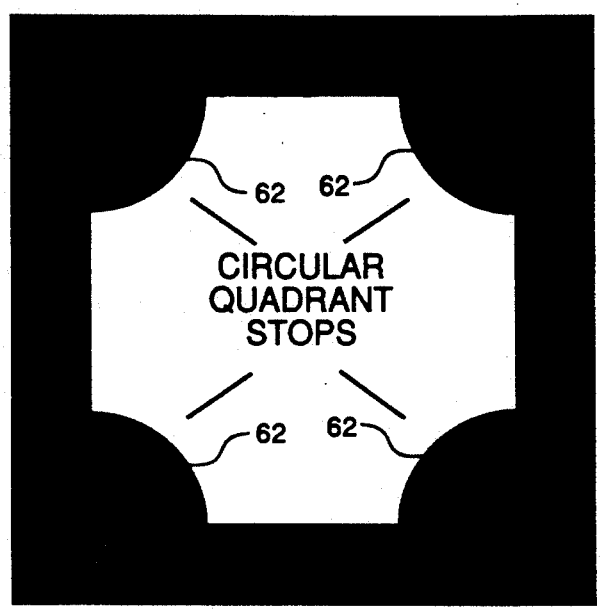
FIG. 25 is a schematic view of the square Lyot stop having circular corner stops used to make the FIG. 24 pupil plane intensity plot.
Figure 24:
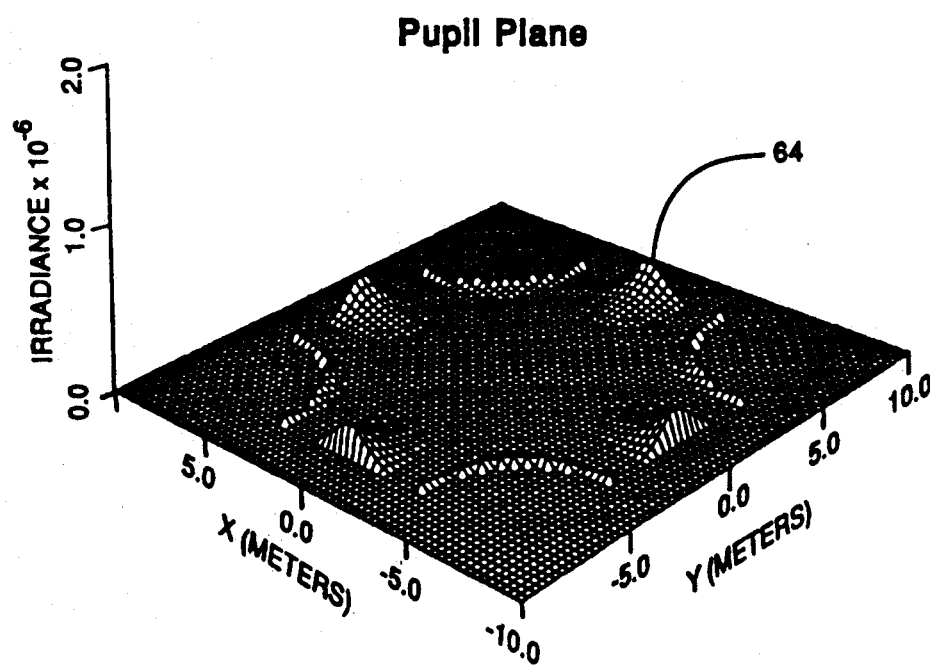
FIG. 24 is a pupil plane intensity plot for a new coronagraph according to the present invention with new circular Lyot corner stops.

FIG. 23 shows a pupil plane intensity plot 60 for a coronagraph with a 14.2 meter wide monolithic square objective and the FIG. 21 Gaussian arms 54 in the first focal plane. The majority of the irradiance was removed from the central portion of the pupil plane and forced into the corners of the pupil plane. This can be seen by comparing FIG. 23 to FIGS. 8 and 11. To stop this irradiance, opaque circular quadrant stops 62 were placed in each corner of the pupil plane, as shown in FIG. 25. Circular quadrant stops 62 reduce the area of the pupil plane not occulted by the Lyot stop to 75% and produce the irradiance plot 64 shown in FIG. 24.

Figure 28:
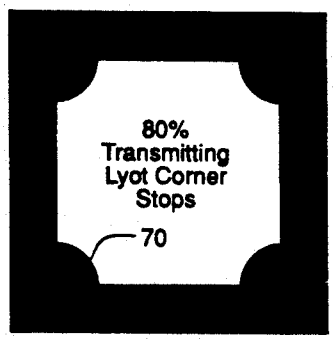
FIG. 28 is a schematic view of the 80% transmitting circular Lyot corner stops used to make the FIGS. 26 and 27 final image plane intensity plots.
Figure 31:
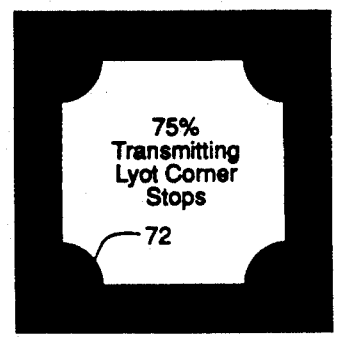
FIG. 31 is a schematic view of the 75% transmitting circular Lyot corner stops used to make the FIGS. 29 and 30 final image plane intensity plots.
Figure 27:
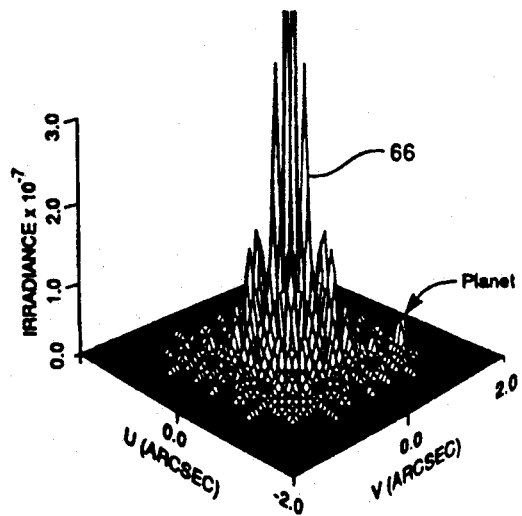
FIG. 27 is a final image plane intensity plot, in three dimensions, for a coronagraph with a monolithic square objective with Gaussian arms in the first focal plane and with 80% transmitting circular Lyot corner stops in the pupil plane.
Figure 30:
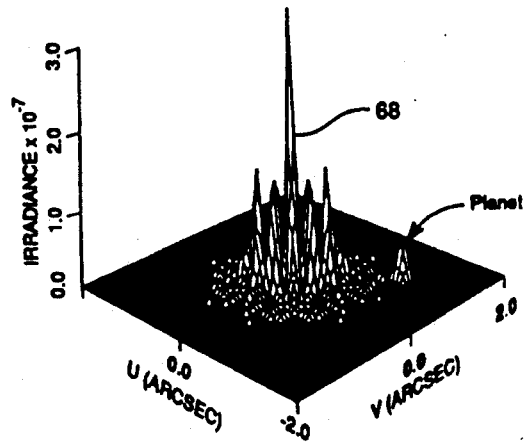
FIG. 30 is a final image plane intensity plot, in three dimensions, for a coronagraph with a monolithic square objective with Gaussian arms in the first focal plane and with 75% transmitting circular Lyot corner stops in the pupil plane.
Figure 26:
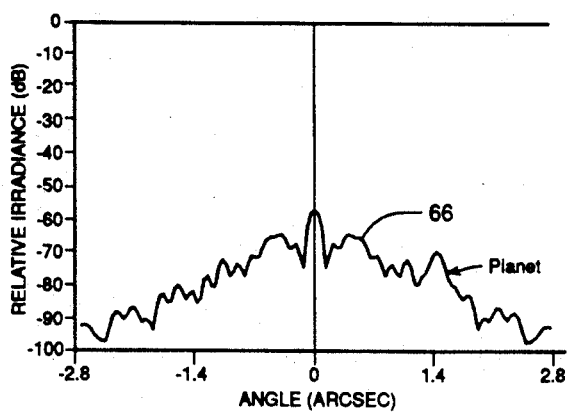
FIG. 26 is a final image plane intensity plot, in two dimensions, for a coronagraph with a monolithic square objective with Gaussian arms in the first focal plane and with 80% transmitting circular Lyot corner stops in the pupil plane.
Figure 29:
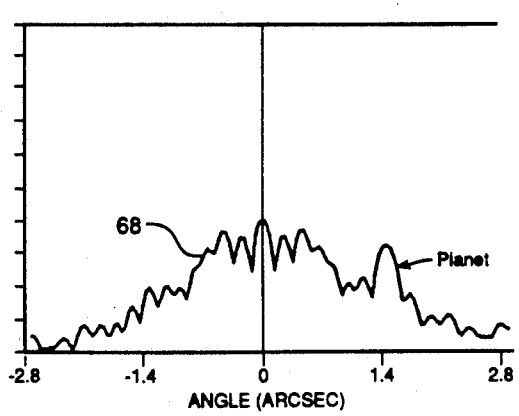
FIG. 29 is a final image plane intensity plot, in two dimensions, for a coronagraph with a monolithic square objective with Gaussian arms in the first focal plane and with 75% transmitting circular Lyot corner stops in the pupil plane.
Figure 34:
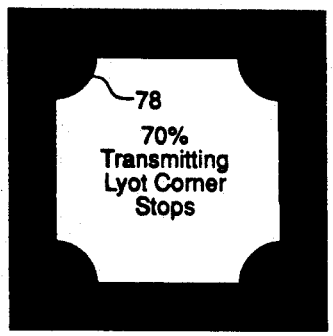
FIG. 34 is a schematic view of the 70% transmitting circular Lyot corner stops used to make the FIGS. 32 and 33 final image plane intensity plots.
Figure 37:
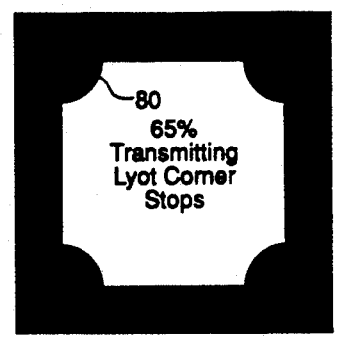
FIG. 37 is a schematic view of the 70% transmitting circular Lyot corner stops used to make the FIGS. 32 and 33 final image plane intensity plots.
Figure 33:
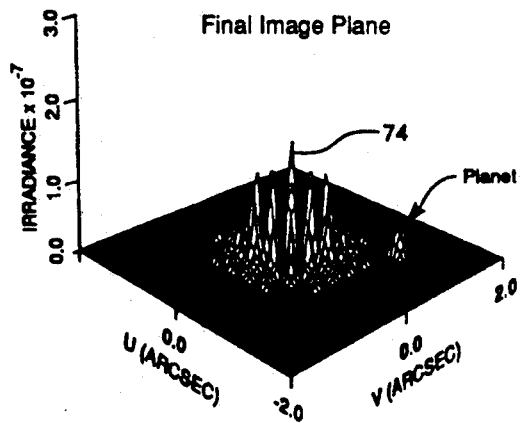
FIG. 33 is a final image plane intensity plot, in three dimensions, for a coronagraph with a monolithic square objective with Gaussian arms in the first focal plane and with 70% transmitting circular Lyot corner stops in the pupil plane.
Figure 36:
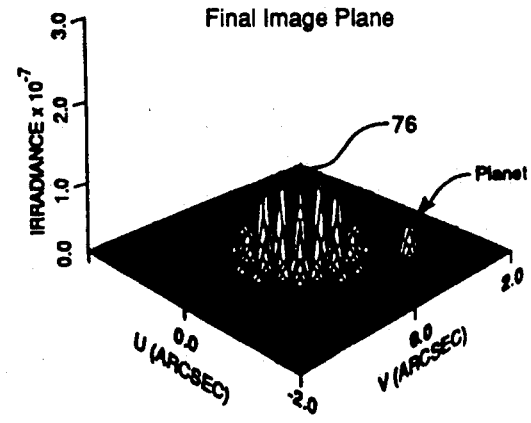
FIG. 36 is a final image plane intensity plot, in three dimensions, for a coronagraph with a monolithic square objective with Gaussian arms in the first focal plane and with 70% transmitting circular Lyot corner stops in the pupil plane.
Figure 32:
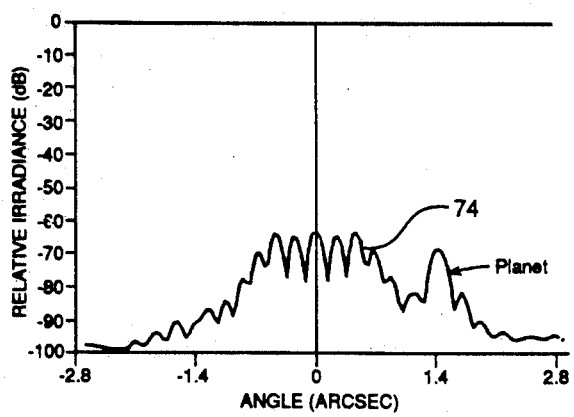
FIG. 32 is a final image plane intensity plot, in two dimensions, for a coronagraph with a monolithic square objective with Gaussian arms in the first focal plane and with 70% transmitting circular Lyot corner stops in the pupil plane.
Figure 35:
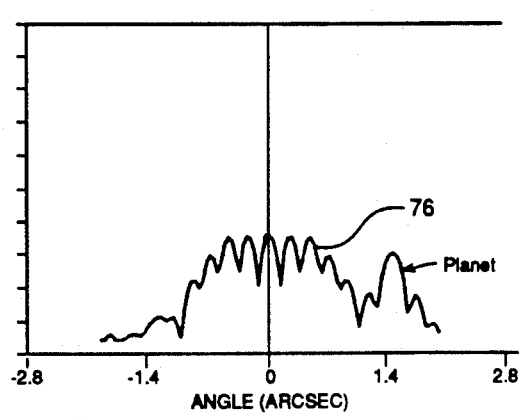
FIG. 35 is a final image plane intensity plot, in two dimensions, for a coronagraph with a monolithic square objective with Gaussian arms in the first focal plane and with 65% transmitting circular Lyot corner stops in the pupil plane.
Figure 40:
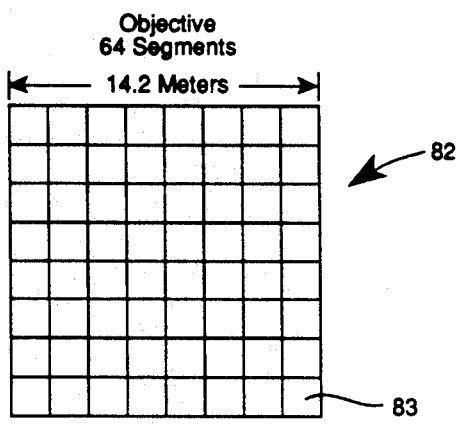
FIG. 40 is a schematic view of the segmented square objective used to make the FIG. 38 final image plane intensity plot.
Figure 43:
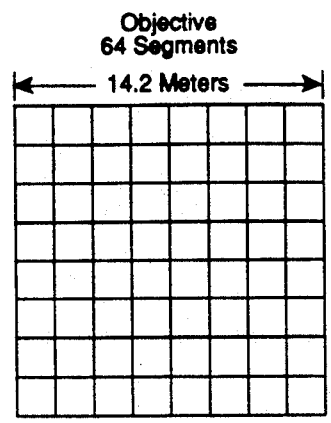
FIG. 43 is a schematic view of the segmented square objective used to make the FIG. 41 final image plane intensity plot.
Figure 39:
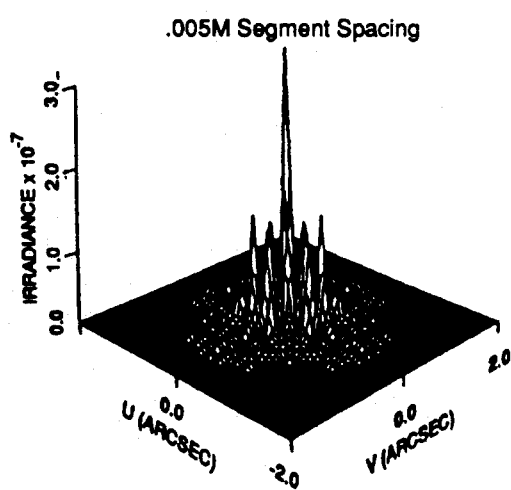
FIG. 39 is a final image plane intensity plot, in three dimensions, for a coronagraph with a segmented square objective of 0.005 meter segment spacing.
Figure 42:
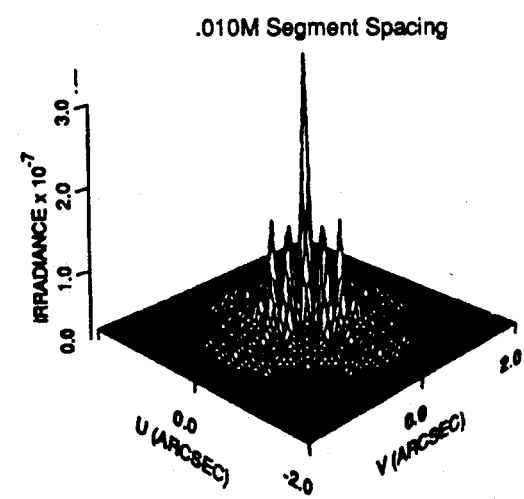
FIG. 42 is a final image plane intensity plot, in three dimensions, for a coronagraph with a segmented square objective of 0.010 meter segment spacing.
Figure 38:
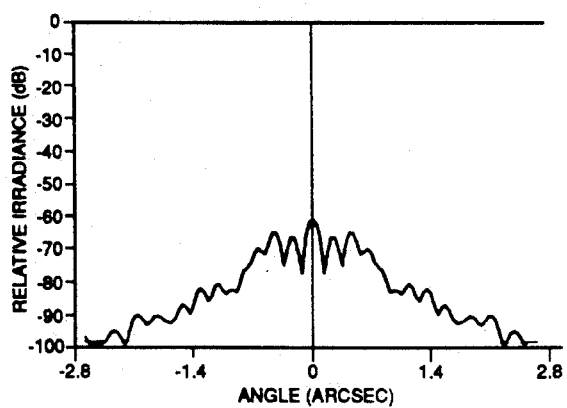
FIG. 38 is a final image plane intensity plot, in two dimensions, for a coronagraph with a segmented square objective of 0.005 meter segment spacing.
Figure 41:
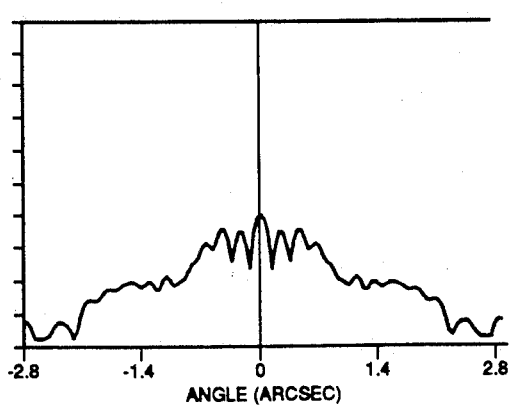
FIG. 41 is a final image plane intensity plot, in two dimensions, for a coronagraph with a segmented square objective of 0.010 meter segment spacing.
Figure 45:
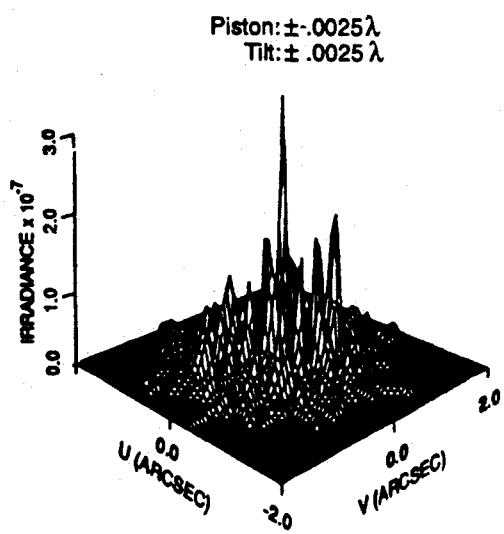
FIG. 45 is a final image plane intensity plot, in three dimensions, for yet another coronagraph with segmented square objective, with piston and tilt errors as shown, for a coronagraph with Gaussian arms in the first focal plane and 75% Lyot corner stops in the pupil plane.
Figure 47:
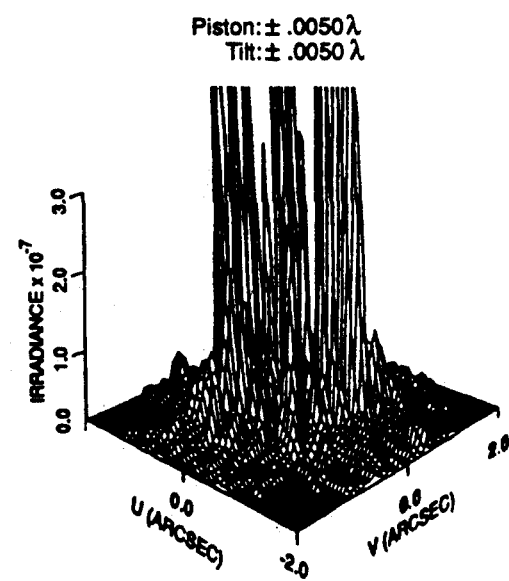
FIG. 47 is a final image plane intensity plot, in three dimensions, for a still further coronagraph with a segmented square objective, with piston and tilt errors as shown, for a coronagraph with Gaussian arms in the first focal plane and 75% Lyot corner stops in the pupil plane.
Figure 44:
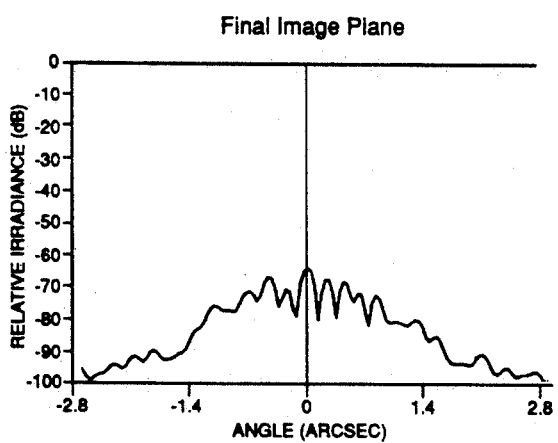
FIG. 44 is a final image plane intensity plot, in two dimensions, for another coronagraph with segmented square objective, with piston and tilt errors as shown, for a coronagraph with Gaussian arms in the first focal plane and 75% Lyot corner stops in the pupil plane.
Figure 46:
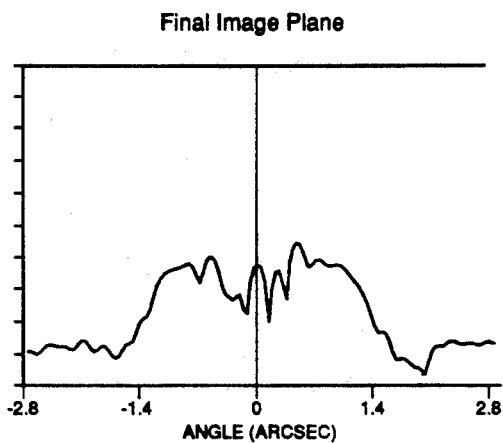
FIG. 46 is a final image plane intensity plot, in two dimensions, for a further coronagraph with a segmented square objective, with piston and tilt errors as shown, for a coronagraph with Gaussian arms in the first focal plane and 75% Lyot corner stops in the pupil plane.

FIGS. 26-27 and 29-30 show the final image plane plots 66 and 68, in both two (FIGS. 26 and 29) and three (FIGS. 27 and 30) dimensions, for coronagraphs with, shown in FIG. 28, 80% transmitting Lyot corner stops 70 and, in FIG. 31, 75% transmitting Lyot corner stops 72. FIGS. 32-33 and 35-36 show the final image plane plots 74 and 76, in both two (FIGS. 32 and 35) and three (FIGS. 33 and 36) dimensions, for coronagraphs with, shown in FIG. 34, 70% transmitting Lyot corner stops 78 and, in FIG. 37, 65% transmitting Lyot corner stops 80. In all cases, the planet is located at (1.0, 1.0) arcseconds. Compared with the FIGS. 14-16 and FIGS. 17-19 systems that incorporated opaque arms and circular and square Lyot stops 50 and 52, this system eliminated a greater amount of stellar irradiance, particularly in the regions nearest the optical axis. In addition to greater stellar suppression, the Gaussian arms and Lyot corner stops allow a greater amount of planet irradiance to propagate though the imaging system. In fact, this system caused only $-1.7$ dB (32%), $-2.4$ dB (43%), $-3.1$ dB (51%) and $-3.7$ dB (57%) peak planet irradiance losses for, respectively, the 80%, 75%, 70% and 65% transmitting stops. This can be compared to the $-3.5$ dB (55%) peak planet irradiance loss suffered by the 80% transmitting circular 50 and square 52 Lyot star stops in FIGS. 14-16 and FIGS. 17-19. The increased planet irradiance will allow shorter optical detector integration times in order to detect planets.

FIGS. 38-40 and 41-43 examine the effect of segmenting a square monolithic objective 82 into 64 square segments. Because a telescope capable of imaging nonsolar planets will most likely have to be located in space, and because the square objective or aperture of such a telescope will probably have to be at least 14.2 meters wide, the objective will have to be segmented so that it can be placed in space. Gaussian arms 0.6 arcsecond wide in the first focal plane and 75% transmitting circular Lyot corner stops are incorporated in this system, but are not shown. Each square segment 83 is 1.77 meters on a side. Segments are separated by 0.005 meter in FIG. 40 and by 0.01 meter in FIG. 43. The effects of the different separations are shown only for the stellar irradiation because including the planet in these calculations would cause excessive computation times. As the spacing increases, a greater amount of energy is forced along the U and V axes. The energy located along the U and V axes is not a concern because a planet located on these axes would be occulted or partially occulted by the Gaussian arms in the first focal plane. However, as the spacing increases to 0.010 meter, some of the energy enters a quadrant where planet viewing could occur. The 0.005 meter spacing only minimally affects the viewing quadrants.

FIGS. 44-45 and 46-47 show the effect of piston and tilt errors in the aperture plane for a segmented imaging system. The piston and tilt values are randomly chosen using a Gaussian distribution. The $3\sigma$ values are $\pm -0.0025\lambda$ for both piston and tilt in FIG. 45 and $\pm -0.0050\lambda$ in FIG. 47. Introducing piston and tilt errors degraded the final image plane diffraction patterns rapidly, especially at the higher values of piston and tilt. These alignment errors limit the imaging ability close to the optical axis. The exterior areas of the field of view in the final image are, however, acceptable for imaging planets. It is clear in any case that a segmented system for nonsolar imaging will require a correction system for alignment errors.

A major potential drawback in segmented systems is the complexity of a required system for maintaining the alignment of the segments. The complex alignment systems used in the 3-element prior art PHASER and in the 6-element Multiple Mirror Telescope ("MMT") systems might lead one to despair at the thought of controlling 64 segments. The new system according to the teachings of the present invention has a distinct advantage that will permit a rather simple alignment scheme. The advantage is the presence of a relatively bright on-axis starlight point source which is deliberately discarded by the coronagraph, and this is available to aid in alignment. The wavefield from a star is planar just before it enters the telescope and experiences all the aberrations of the entire optical system up to the apodizer, including the piston and tilt errors arising from misalignments of the telescope segments. This wavefield can be used to sense segment misalignments which can then be used to drive a correction system.

Figure 48:
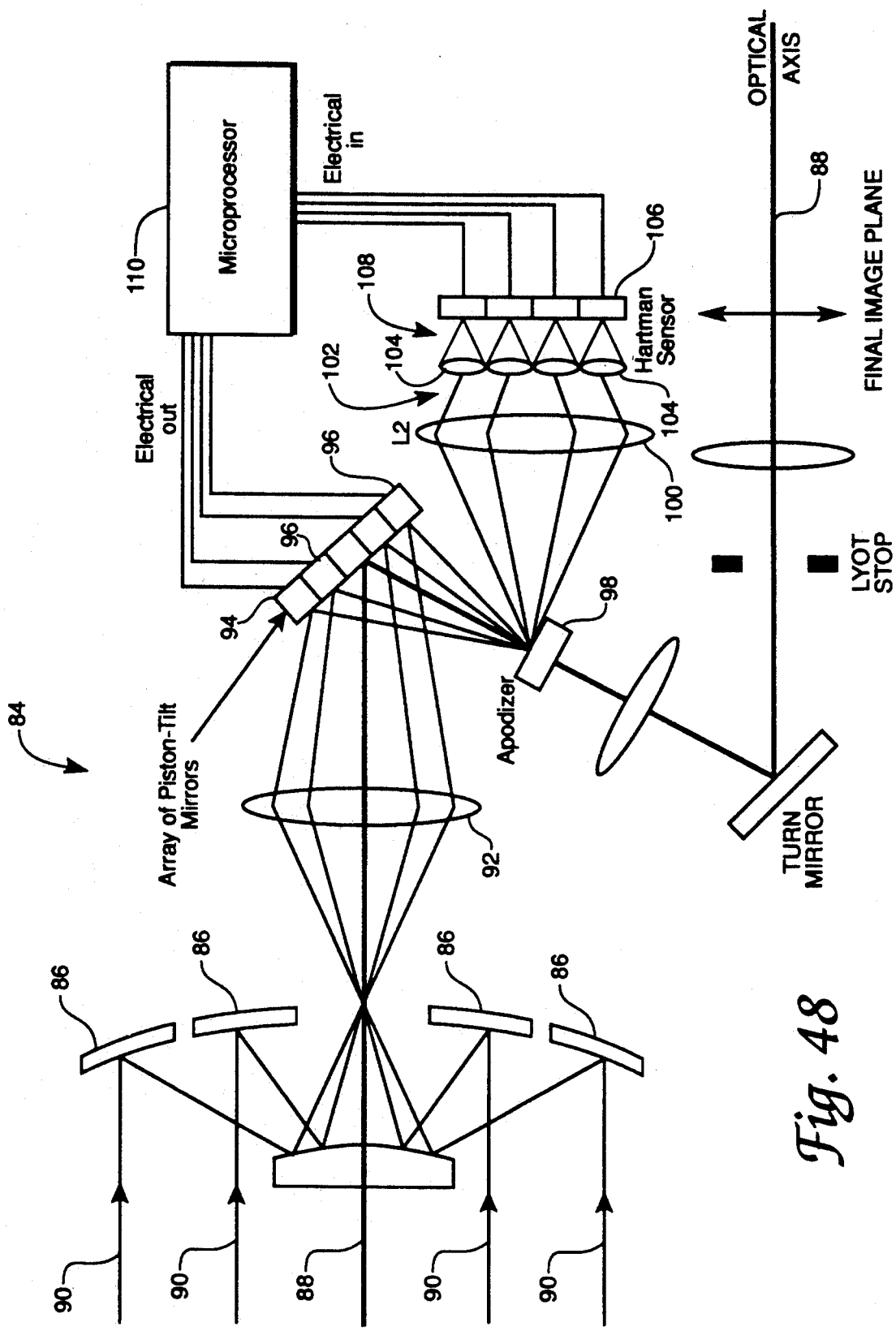
FIG. 48 is a schematic view of a segmented telescope system using any coronagraph and utilizing the apodizer from the coronagraph as part of a Hartman sensor driven wavefront correction system.

FIG. 48 shows an example embodiment of an alignment system according to the present invention. Light from a distant star and its associated planets enters a segmented telescope 84 from the left. Telescope 84 is depicted in one dimension and with only four primary segments 86 for simplicity. Bold line 88 traces the optical axis through telescope 84. Four rays 90 from the star (one associated with each of the four segments) are shown traced through telescope 84. Rays 90 are directed by a lens 92 onto an array 94 of piston-tilt mirrors 96. Each mirror 96 is in a conjugate image plane of a corresponding telescope primary segment 86. Each mirror 96 can be adjusted in tilt and piston to compensate for tilt and piston errors in its associated segment 86.

Sensing of the required amount of correction is accomplished after rays 90 are reflected from mirror array 94, and then reflected from the back of an apodizer 98. The stellar wavefront can be made to reflect at the required angle by using a holographic optical element (HOE). Apodizer 98 functions as the on-axis stellar stop for the coronagraph. Rays 90 reflected from apodizer/stop 98 are directed by a lens 100 onto an array 102 of lenses 104. Lenses 104 are in a conjugate image plane of both the telescope 84 primary segments 86, and associated piston-tilt mirrors 96. Each lens 104 focuses all of the rays which reflect from its corresponding telescope primary segment 86, and associated piston-tilt mirror 96, onto a position sensor 106. The lens array 102 and an associated position sensor array 106 are the optical front end of a prior art Hartman sensor 108, as described at pages 323-349 of *Optical Shop Testing*, published by John Wiley and Sons, New York.

Hartman sensor 108 provides differential tilt information that can be used to calculate the piston and tilt errors associated with each telescope segment. This information can be used to calculate correction signals for array 94 of piston-tilt mirrors 96. Thus, the planet wavefield which passes to one side of the apodizer into the coronagraph will be corrected for any telescope segment misalignment. A microprocessor 110 is shown schematically for performing the calculations for correcting piston and tilt alignment errors of mirrors 96.

Those with skill in the art of the invention will readily see that a variety of different readily available components may be used as part of the disclosed alignment system. For example, a shearing interferometer could be used instead of a Hartman sensor.

The disclosed alignment system will also find valuable use with a Earth-based telescope system. New systems for compensating for atmospheric optical distortions, such as the laser guide star system, may permit large objective infrared telescopes, such as will be needed to search for nonsolar planets, to be Earth-based. The disclosed alignment system can be combined with such new systems to increase the possibility of the successful use of such Earth-based large objective infrared telescopes.

The disclosed new coronagraph system successfully demonstrates the use of a unique cross-shaped apodizer in the first focal plane and a square Lyot stop (which may include circular corner stops) in the pupil plane to sufficiently suppress diffracted starlight to permit discovery of an orbiting nonsolar planet. Although the disclosed apparatus is specialized, its teachings will find application in other areas of imaging where a target object is physically close to a much brighter nontarget object. Its teachings will also find application in other areas where prior art systems, and not just imaging systems, may be improved by investigation of the effect of changing the shape of key elements of the prior art systems.

It is understood that various modifications to the invention as described may be made, as might occur to one with skill in the field of the invention, within the scope of the claims. Therefore, all embodiments contemplated have not been shown in complete detail. Other embodiments may be developed without departing from the spirit of the invention or from the scope of the claims.

We claim:

1. A coronagraph for a telescope having a square objective, comprising:
    (a) an apodizer comprising crossed arms; and,
    (b) a Lyot stop having a square opening.
2. The coronagraph according to claim 1, wherein the apodizer is in a first focal plane and the Lyot stop is in a pupil plane.
3. The coronagraph according to claim 1, wherein the apodizer arms are opaque along their centerlines and become progressively more transmissive toward their edges according to a preselected profile.
4. The coronagraph according to claim 3, wherein the preselected profile is a Gaussian curve.
5. The coronagraph according to claim 1, further comprising a circular quadrant stop at each corner of the Lyot stop square opening.
6. A method for a telescope having a square objective using a coronagraph for suppressing light energy from an on-axis light source, comprising the steps of:
    (a) blocking on-axis light rays from the light source with an apodizer comprising crossed arms; and,
    (b) blocking diffracted light rays from the on-axis light source with a Lyot stop having a square opening.
7. The method for suppressing light energy from an on-axis light source according to claim 6, further comprising the step of blocking diffracted light rays from the on-axis light source with a circular quadrant stop located at each corner of the Lyot stop square opening.

* * * * *